(12) United States Patent
Shiiyama

(10) Patent No.: US 6,977,963 B1
(45) Date of Patent: Dec. 20, 2005

(54) SCENE CHANGE DETECTION METHOD USING TWO-DIMENSIONAL DP MATCHING, AND IMAGE PROCESSING APPARATUS FOR IMPLEMENTING THE METHOD

(75) Inventor: Hirotaka Shiiyama, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/503,477

(22) Filed: Feb. 14, 2000

(30) Foreign Application Priority Data

Feb. 15, 1999 (JP) ................................. 11-036524

(51) Int. Cl.⁷ ............................. H04N 7/12; H04N 5/14
(52) U.S. Cl. .................................. 375/240.24; 348/700
(58) Field of Search ..................... 375/240.02–240.08, 375/240.12–240.18, 240.26, 240.24; 348/700

(56) References Cited

U.S. PATENT DOCUMENTS

| | | | | |
|---|---|---|---|---|
| 5,099,322 A | * | 3/1992 | Gove | ......................... 348/700 |
| 5,576,950 A | * | 11/1996 | Tonomura et al. | .......... 386/121 |
| 5,802,361 A | * | 9/1998 | Wang et al. | ................. 382/217 |
| 5,805,733 A | * | 9/1998 | Wang et al. | ................. 382/232 |
| 5,821,945 A | * | 10/1998 | Yeo et al. | .................... 345/440 |
| 6,208,385 B1 | * | 3/2001 | Konishi et al. | .............. 348/558 |
| 6,219,382 B1 | * | 4/2001 | Kikuchi et al. | ......... 375/240.16 |
| 6,404,920 B1 | * | 6/2002 | Hsu | ........................... 382/190 |
| 6,571,054 B1 | * | 5/2003 | Tonomura et al. | ............ 386/95 |
| 6,606,636 B1 | * | 8/2003 | Okazaki et al. | .......... 707/104.1 |
| 2001/0003214 A1 | * | 6/2001 | Shastri et al. | ............... 725/109 |

* cited by examiner

Primary Examiner—Vu Le
Assistant Examiner—Dave Czekaj
(74) Attorney, Agent, or Firm—Fitzpatrick, Cella, Harper & Scinto

(57) ABSTRACT

There is provided a scene change detection method which is independent from an encoder of a file, and can assure high real-time performance and effective, quick processes, and an image processing apparatus that can implement the method. Frame image data is extracted from moving image data (S11), the frame image data is segmented into a plurality of blocks (S12), labels are assigned in accordance with feature amounts acquired in units of blocks (S13), a sequential label set is generated by arranging the assigned labels in a predetermined block order (S14), similarities between the generated sequential label set and sequential label sets of a previous frame image data group are computed by two-dimensional DP matching and a scene change frame in the moving image is detected from a computed similarity group (S15, S16), and the detected scene change frame information is stored in correspondence with the frame image data.

55 Claims, 12 Drawing Sheets

FIG. 7A

| 1 | 2 | 3 |
|---|---|---|
| 4 | 5 | 6 |
| 7 | 8 | 9 |

FIG. 7B

| 3 | 2 | 1 |
|---|---|---|
| 6 | 5 | 4 |
| 9 | 8 | 7 |

FIG. 7C

| 7 | 8 | 9 |
|---|---|---|
| 4 | 5 | 6 |
| 1 | 2 | 3 |

FIG. 7D

| 9 | 8 | 7 |
|---|---|---|
| 6 | 5 | 4 |
| 3 | 2 | 1 |

| MOVING IMAGE ID | FILE NAME OF FULL-PATH MOVING IMAGE | ANOTHER ATTRIBUTE |
|---|---|---|

FIG. 10

|   | 1 | 2 | 3 | 4 | 5 | 6 | 7 | 8 | ..... |
|---|---|---|---|---|---|---|---|---|-------|
| 1 | 0 | 1 | 1 | 5 | 2 | 5 | 7 | 7 | ..... |
| 2 |   | 0 | 2 | 1 | 1 | 7 | 2 | 5 | ..... |
| 3 |   |   | 0 | 7 | 1 | 1 | 5 | 2 | ..... |
| 4 |   |   |   | 0 | 2 | 9 | 1 | 7 | ..... |
| ⋮ |   |   |   |   |   |   |   |   |       |

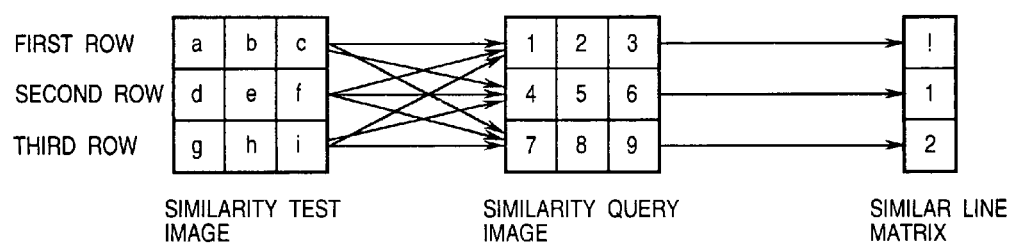
F I G. 11

SCENE CHANGE DETECTION METHOD USING TWO-DIMENSIONAL DP MATCHING, AND IMAGE PROCESSING APPARATUS FOR IMPLEMENTING THE METHOD

FIELD OF THE INVENTION

The present invention relates to a scene change detection method for detecting a change in moving image scene (a so-called scene change) from a moving image, and an image processing apparatus for implementing the method.

BACKGROUND OF THE INVENTION

As conventional methods of extracting a scene change from a moving image, a method of computing changes in histogram of colors of frames that form the moving image, and detecting an evaluation value by executing some threshold value process, a method using motion vector information which is used in MPEG2 or the like, and the like have been proposed.

The method using the histograms has merits such as low computation cost, high-speed processing, and high real-time performance, but has the following demerits. That is, a scene change cannot be detected from scenes having similar histograms, or scene changes are excessively detected due to an abrupt deformation or rotation of an object.

On the other hand, the method using a motion vector can assure high precision, and can also be used in other applications such as object extraction and the like, but requires much time for computations, resulting in poor real-time performance. Even when motion vector information is extracted from data encoded by MPEG2 and motion vector computations are omitted, since the precision of these motion vector computations depends on the performance of an encoder, high performance cannot always be guaranteed for all MPEG2 files.

SUMMARY OF THE INVENTION

The present invention has been made in consideration of the aforementioned problems, and has as its object to provide a scene change detection method which considers color and composition, and an image processing apparatus for implementing the method.

It is another object of the present invention to provide a scene change detection method which is independent from an encoder of a file, and can assure high real-time performance and effective, quick processes, and an image processing apparatus that can implement the method.

In order to achieve the above objects, an image processing apparatus according to the present invention, comprises: labeling means for extracting frame image data from moving image data, segmenting the frame image data into blocks, and assigning labels in accordance with feature amounts acquired in units of blocks; label sequence generation means for generating a label sequence by arranging the labels assigned by the labeling means in a predetermined block order; label sequence accumulation means for accumulating the label sequence generated by the label sequence generation means in correspondence with the frame image data; similarity computation means for computing similarities between the generated label sequence and label sequences of a previous frame image data group; scene change detection means for detecting a scene change frame in the moving image from a computed similarity group; and scene change storage means for storing the detected scene change frame information in correspondence with the frame image data.

In order to achieve the above objects, a scene change detection method according to the present invention comprises the steps of: extracting frame image data from moving image data, segmenting the frame image data into blocks, and assigning labels in accordance with feature amounts acquired in units of blocks; generating a label sequence by arranging the assigned labels in a predetermined block order; computing similarities between the generated label sequence and label sequences of a previous frame image data group; and detecting a scene change frame in the moving image from a computed similarity group.

In order to achieve the above objects, a storage medium stores a control program for making a computer execute scene change detection, and the control program includes: the step of extracting frame image data from moving image data, segmenting the frame image data into blocks, and assigning labels in accordance with feature amounts acquired in units of blocks; the step of generating a label sequence by arranging the assigned labels in a predetermined block order; the step of computing similarities between the generated label sequence and label sequences of a previous frame image data group; and the step of detecting a scene change frame in the moving image from a computed similarity group.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7A to 7D are views for explaining examples of block orders used upon generating a sequential label set according to the embodiment of the present invention;

FIG. 8 is a view for explaining the storage format of moving image data file information in a moving image management database according to the embodiment of the present invention;

FIG. 10 shows an example of a penalty matrix among labels used upon computing similarity by comparing label matrices according to the embodiment of the present invention;

FIG. 11 is a view for explaining a similarity computation process according to the embodiment of the present invention;

DETAILED DESCRIPTION OF THE PREFERRED EMBODIMENTS

Preferred embodiments of the present invention will now be described in detail in accordance with the accompanying drawings.

Example of Arrangement of Image Processing Apparatus of this Embodiment

Figure 1:
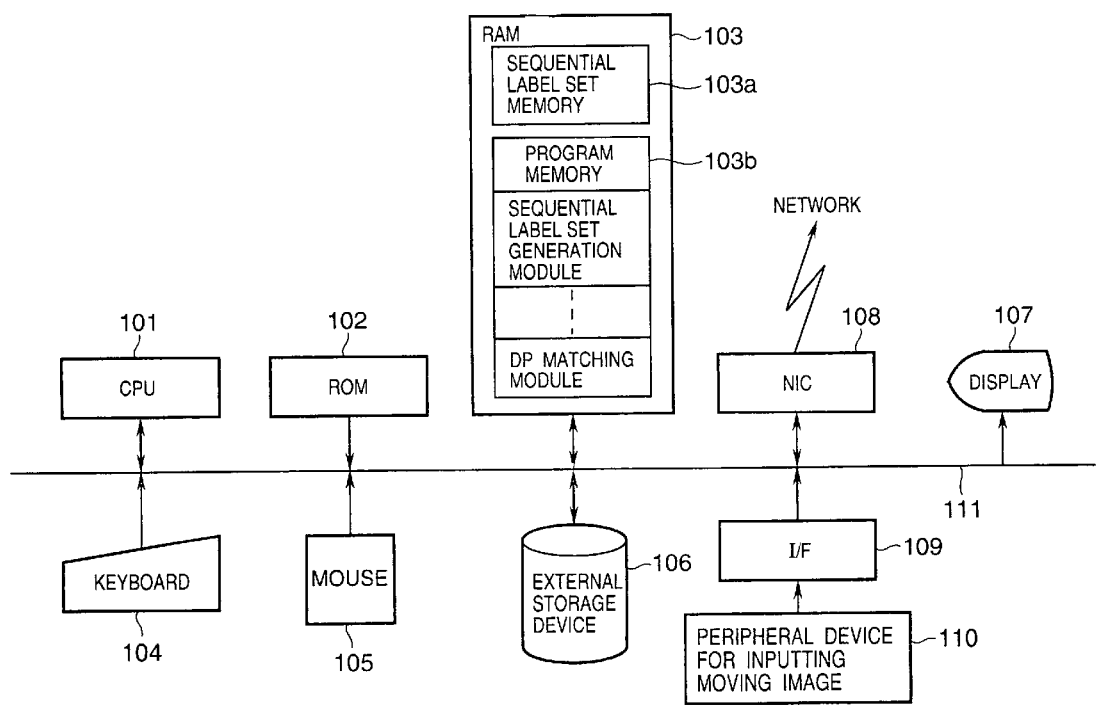
FIG. 1 is a block diagram showing an example of the arrangement of an image processing apparatus having a scene change detection function according to an embodiment of the present invention.

FIG. 1 is a block diagram showing an example of the arrangement of an image processing apparatus having a scene change detection function according to an embodiment of the present invention.

Referring to FIG. 1, reference numeral 101 denotes a CPU which executes various kinds of computation and control in a scene change detection apparatus of this embodiment. Reference numeral 102 denotes a ROM which stores a boot program executed upon starting up the apparatus, and various permanent data. Reference numeral 103 denotes a RAM which stores control programs to be processed by the CPU 101, and provides a work area used when the CPU 101 executes various kinds of control. For example, the RAM 103 has a sequential label set memory 103a for storing a sequential label set of a plurality of frames of a moving image, and a program memory 103b including a sequential label set generation module, DP matching module, and the like, and is also used as a frame image memory (to be described later). Reference numeral 104 denotes a keyboard; and 105, a mouse, which provide various input operation environments for the user.

Reference numeral 106 denotes an external storage device which comprises a hard disk, floppy disk, CD-ROM, or the like, and stores, e.g., a moving image management database (to be described later). Reference numeral 108 denotes a network interface which allows communications with devices on a network. Reference numeral 109 denotes an interface; and 110, a peripheral device for inputting a moving image. Reference numeral 111 denotes a bus for connecting the aforementioned components.

Note that the external storage device 106 in the above arrangement may use the one connected on the network. Also, the peripheral device 110 for inputting a moving image indicates various devices for inputting a moving image such as a video deck, video player, television tuner, and the like in addition to a video camera. Furthermore, the control programs in the RAM 103 may be loaded from the external storage device 106, peripheral device 110, or network, and may be executed.

Figure 2:
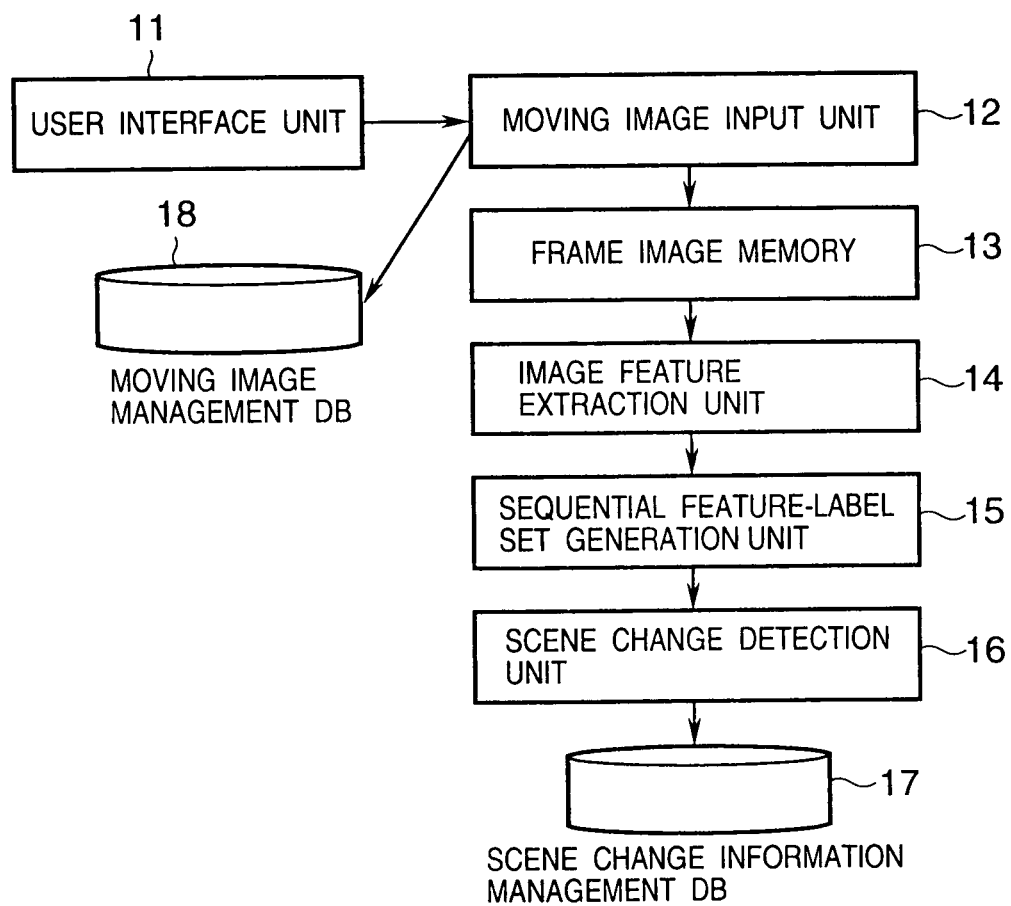
FIG. 2 is a block diagram showing an example of the arrangement of the scene change detection function according to the embodiment of the present invention.

FIG. 2 is a block diagram showing the arrangement of a scene change detection function of the image processing apparatus of this embodiment.

Referring to FIG. 2, reference numeral 11 denotes a user interface unit which detects various operation inputs from the user using a display 107, and the keyboard 104 and mouse 105. Reference numeral 12 denotes a moving image input unit for capturing frames of a moving image via the peripheral device 110 for inputting a moving image. Reference numeral 13 denotes a frame image memory for storing frame image data captured by the moving image input unit 12 in a predetermined area of the RAM 103.

Reference numeral 14 denotes an image feature amount extraction unit for extracting feature amounts from images stored in the frame image memory 13 in the sequence to be described later. Reference numeral 15 denotes a sequential feature-label set generation unit for generating a sequential label set on the basis of feature amounts extracted by the feature amount extraction unit 14. Reference numeral 16 denotes a scene detection unit by means of pattern matching, which detects a scene change frame by computing similarities between the generated sequential label set and a group of sequential label sets of N neighboring or adjacent frame images stored in a predetermined area of the RAM 103, and performing a threshold value comparison process of the computed similarities. Then, the unit 16 discards a sequential label set of the oldest frame image stored in the RAM 103 and stores a sequential label set of the current frame image in the FIFO (First In, First Out) principle.

Reference numeral 17 denotes a scene change information accumulation unit which stores and accumulates information indicating a frame corresponding to a scene change point of moving image data obtained by the moving image input unit 12 and the like.

Figure 3:
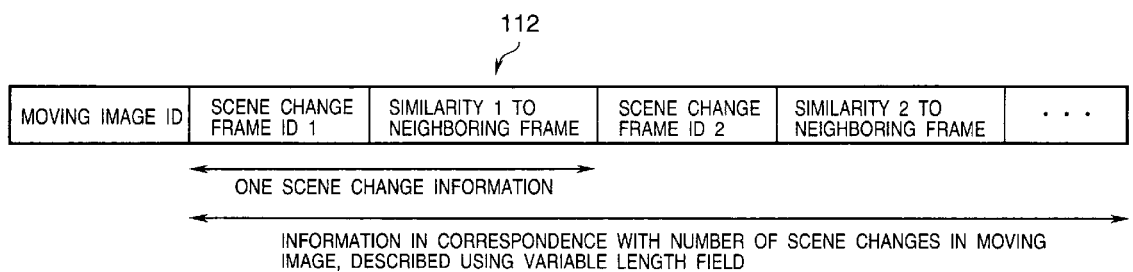
FIG. 3 is a view for explaining the storage state of scene change information in a scene change information accumulation/management DB according to the embodiment of the present invention.

FIG. 3 is a view for explaining the storage state of scene change information in the scene change information accumulation unit 17.

Image frames in moving image data are assigned unit image frame IDs in that moving image, and the scene change information accumulation unit 17 holds scene change information 112 in the form of an image frame ID from which a new scene starts.

Reference numeral 18 denotes a moving image management database (to be referred to as a moving image management DB hereinafter), which manages moving image data 113 and the scene change information stored in the scene change information accumulation unit 17 in correspondence with each other in the data format shown in FIG. 8.

A scene change detection process will be described in detail below.

Frame images are extracted in turn from a moving image, each of these frame images is segmented into a plurality of blocks, and labels are assigned in accordance with feature amounts acquired in units of blocks. A sequential label set is generated by arranging the assigned labels on the basis of a predetermined block order, and generated sequential label sets for N previous frames are stored in the memory. At this time, the sequential label set of the current frame is compared with those of previous frames stored in the memory, and the presence/absence of a scene change is determined based on the comparison result.

Operation Example of Image Processing Apparatus of this Embodiment

An example of the operation of the image processing apparatus of this embodiment with the above arrangement will be described below. Note that the example to be described below adopts three colors, i.e., red (R), green (G), and blue (B) as image feature amounts that pay attention to colors, and will be explained using processes in a three-dimensional color space.

(Process for Obtaining Sequential Label Set from Frame)

A process for generating a sequential label set by extracting one frame image from a moving image, and segmenting the frame image into a plurality of blocks, assigning labels in accordance with feature amounts acquired in units of blocks, and arranging the assigned labels on the basis of a predetermined block order will be explained below.

Figure 4:
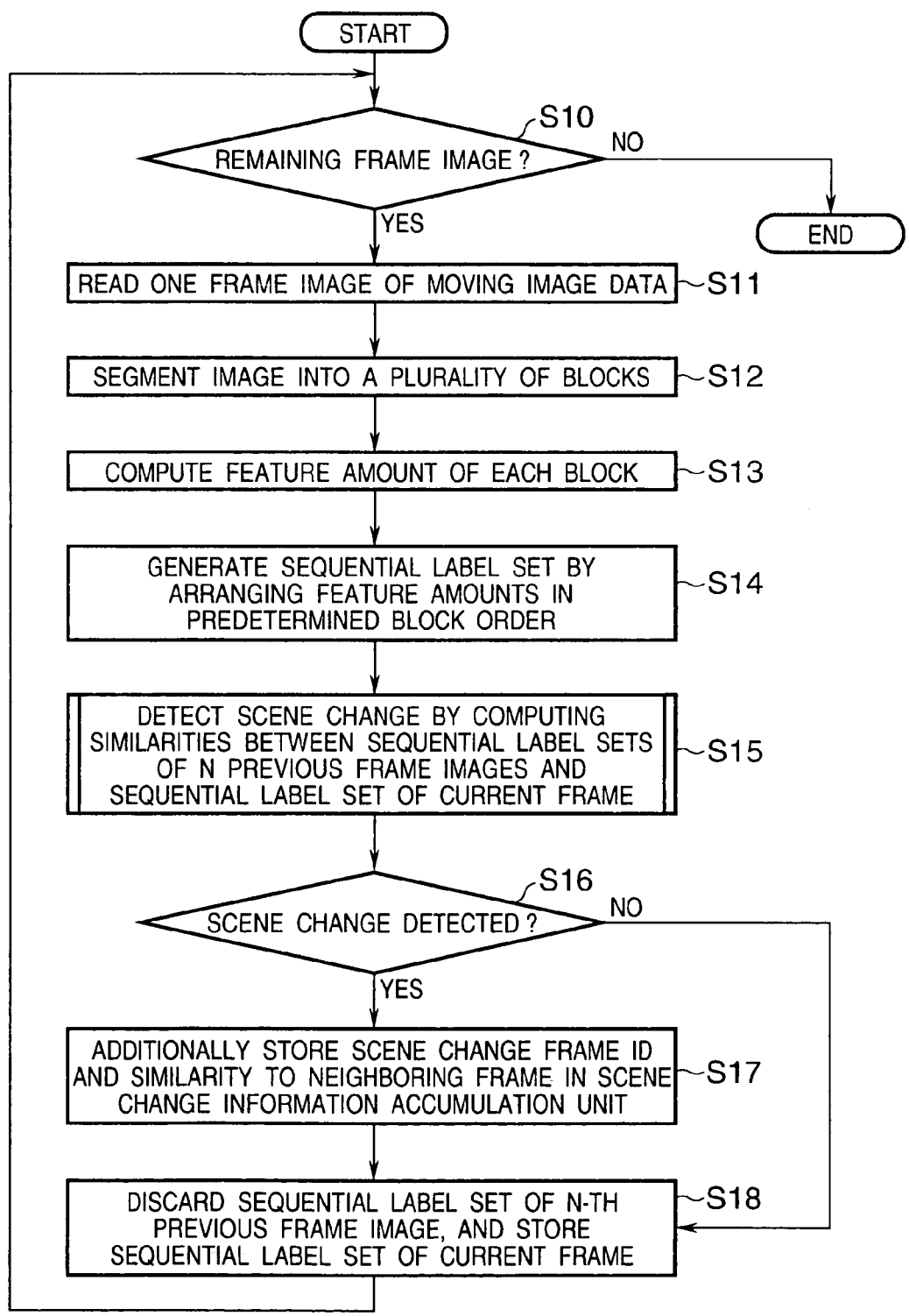
FIG. 4 is a flow chart showing the sequence of a scene change information generation process according to the embodiment of the present invention.

FIG. 4 is a flow chart showing the sequence of the process for obtaining a sequential label set from a frame according to this embodiment.

When a moving image file to be subjected to scene change detection is designated via the user interface unit 11, processes in steps S11 to S18 are repeated until it is determined in step S10 that the remaining frame images are present.

Figure 5:
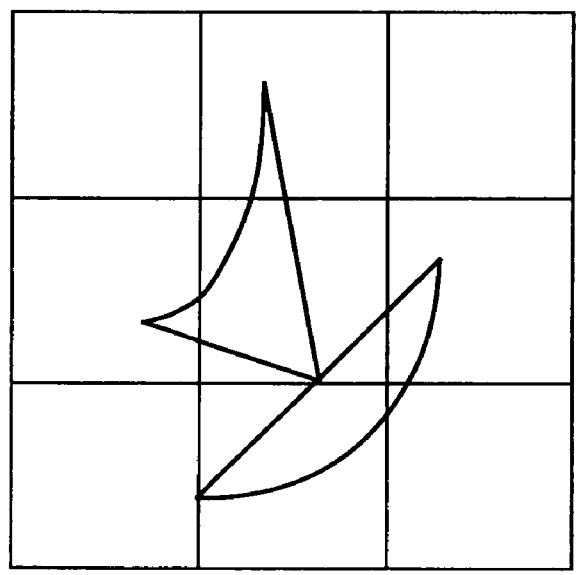
FIG. 5 shows an example of an image segmented into blocks according to the embodiment of the present invention.

In step S1, one frame image is read out by seeking the moving image file, and is held in the frame image memory 13. In step S12, the held image is segmented into a plurality of blocks. In this embodiment, the image is segmented into a plurality of vertical and horizontal blocks. FIG. 5 shows an example of an image segmented into blocks according to this embodiment. As shown in FIG. 5, in this embodiment the image is segmented into a total of nine (3×3) blocks. In step S13, feature amounts of the segmented blocks are computed, and the obtained feature amounts are labeled in the following sequence.

Figure 6:
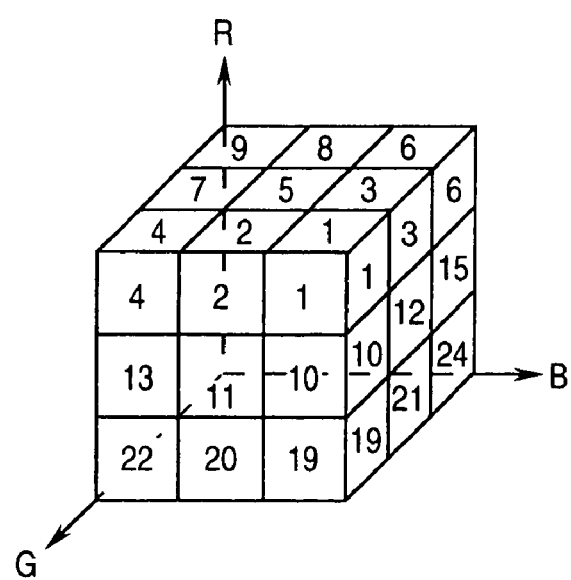
FIG. 6 is a view for explaining a multi-dimensional feature amount space according to the embodiment of the present invention.

FIG. 6 is a view for explaining a multi-dimensional feature amount space according to this embodiment.

As shown in FIG. 6, the multi-dimensional feature amount space (RGB color space) is segmented into a plurality of blocks (color blocks), i.e., cells (color cells), and unique labels are assigned as serial numbers to the individual cells (color cells). The reason why the multi-dimensional feature amount space (RGB color space) is segmented into a plurality of blocks is to absorb delicate feature amount (color) differences.

In step S13, a predetermined image feature amount extraction computation process is done for each segmented block obtained in step S12 to obtain a cell on the multi-dimensional feature amount space to which that block belongs, thus obtaining a corresponding label. This process is done for all the blocks. That is, in the image feature amount extraction computation process of this embodiment, computation process is done to determine which color cells all pixels in each segmented block belong to respectively, and the label of color cell with the highest frequency of occurrence is determined to be a parameter label (color label) of that segmented image block. This process is done for all the blocks.

After parameter labels are assigned to the individual blocks, the parameter labels assigned to the blocks are arranged in a predetermined block order to generate a parameter sequential label set (to be referred to as a sequential label set hereinafter) in step S14.

FIGS. 7A to 7D are views for explaining examples of block orders used upon generating a sequential label set. The parameter labels are arranged in ascending order of numerals in boxes of the segmented image blocks shown in each of FIGS. 7A to 7D to generate a sequential label set.

Note that scan methods that can be applied to this embodiment include, for example:

horizontal scans (e.g., scan methods for making a left-to-right scan from up to down: FIG. 7A, making a left-to-right scan from down to up: FIG. 7C, making a right-to-left scan from up to down: FIG. 7B, making a right-to-left scan from down to up: FIG. 7D, and so forth are available); and vertical scans (e.g., scan methods for making an up-to-down scan from left to right, making an up-to-down scan from right to left, making a down-to-up scan from left to right, making a down-to-up scan from right to left, and so forth are available (none of these methods are shown)). However, the present invention is not limited to such specific methods.

This embodiment adopts a scan method which satisfies the following conditions.

(1) Since label matrices are time-serially compared, it is not preferable to reverse this order. Hence, all images must be scanned by a predetermined scan method to obtain label matrices.

(2) Nearby blocks are preferably located at near positions in a sequential label set.

(3) Matching can be made more easily as the labels of blocks that correspond to an object of interest appear as quickly as possible, and continuously appear for a long period of time.

(4) Even when an object has moved or camera angle has changed, an arrangement of labels is prevented from changing drastically.

This embodiment adopts a scan method for making a horizontal scan from left to right, up to down, as shown in FIG. 7A.

(Process for Detecting Scene Change)

Sequential label sets for N previous frames, which are obtained in the above sequence, are accumulated on the memory, and a scene change is detected in step S15 by comparing sequential label sets of N previous frames and a sequential label set of the current frame. Assume that the minimum value of N is 2.

Figure 9:
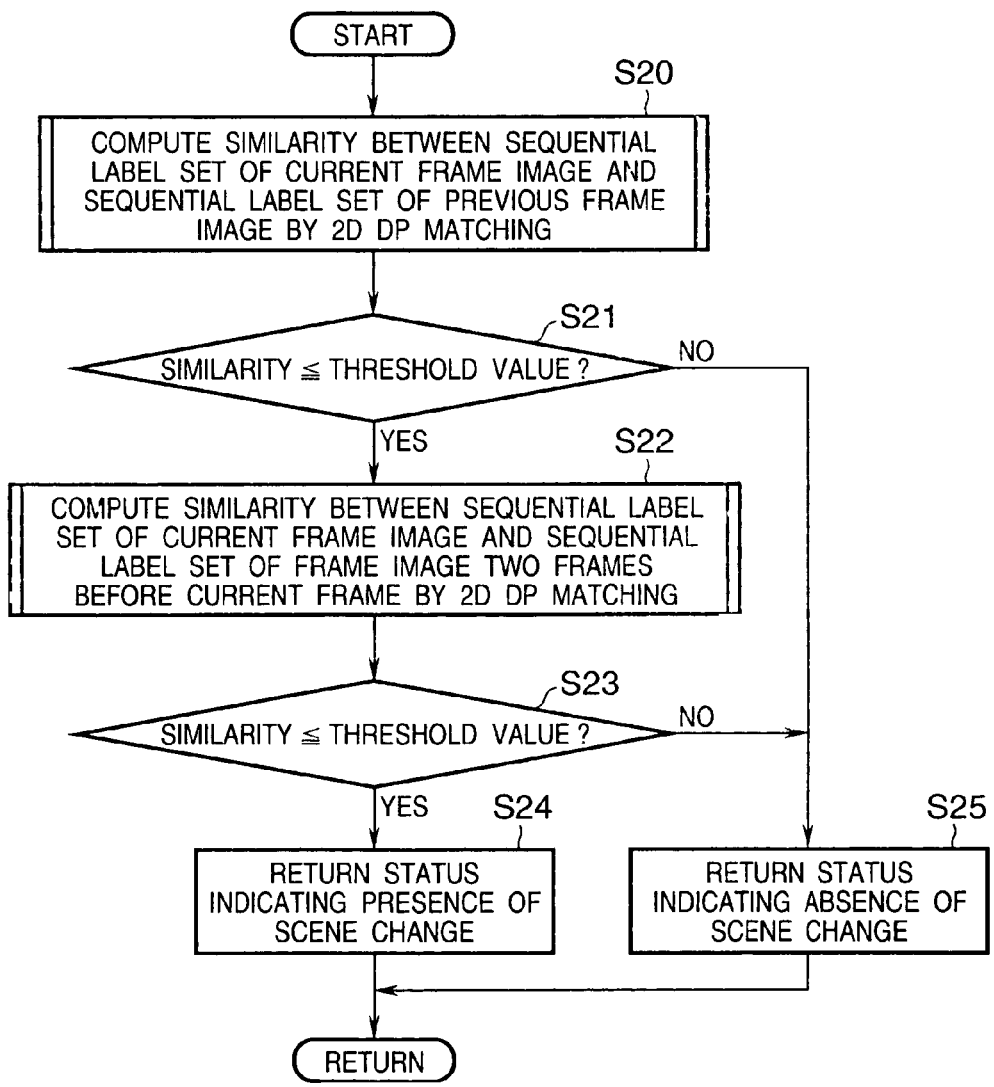
FIG. 9 is a flow chart showing the detailed sequence of a scene change detection process in FIG. 4 according to the embodiment of the present invention.

An example for detecting a scene change from a sequential label set of this embodiment will be explained below using the flow chart in FIG. 9 that shows details of step S15, taking as an example a method for detecting scene changes from a moving image obtained by connecting frames including quite different scenes. Even the moving image obtained by connecting frames including quite different scenes includes errors such as omission of a frame upon editing, a sudden change in brightness in only one frame upon, e.g., emission of flash light of a camera, and the like, and it is important to prevent operation errors (excessive detection of scene changes) against such moving image.

In step S20, the similarity between a sequential label set obtained from the current frame image and that obtained from the immediately preceding frame image is computed by a method to be described later. In step S21, the similarity is compared with a threshold value. If the similarity is larger than the threshold value, status indicating the absence of status change is returned in step S25, and the flow returns to the main routine. To supplement, the flow then returns to FIG. 4 and advances from step S16 to step S18 to store the sequential label set of the current frame image in the RAM. After that the flow returns to step S10 to proceed with the process for capturing a new frame image in step S11 and the subsequent steps.

If it is determined in step S21 that the similarity is equal to or smaller than the threshold value, the sequential label set obtained from the current frame image is compared with that obtained from a frame image two frames before the current frame image, which was obtained and stored in the RAM previously, in step S22, and if it is determined in step S23 that the similarity between these two sequential label sets is equal to or smaller than the threshold value, status indicating the presence of scene change is returned. If it is determined in step S23 that the similarity is larger than the threshold value, it is determined that an edit error or a sudden change in brightness in only one frame upon, e.g., emission of flash light of a camera has occurred, and status indicating the absence of scene change is returned in step S25.

(Process for Computing Similarity)

A method of computing the similarity between frame images, i.e., comparing two sequential label sets to check if they are similar to each other (to compute their similarity) will be described in detail below. Note that a sequential label set acquired in step S14 will be referred to as a query label matrix of a query frame image hereinafter.

Figure 10:
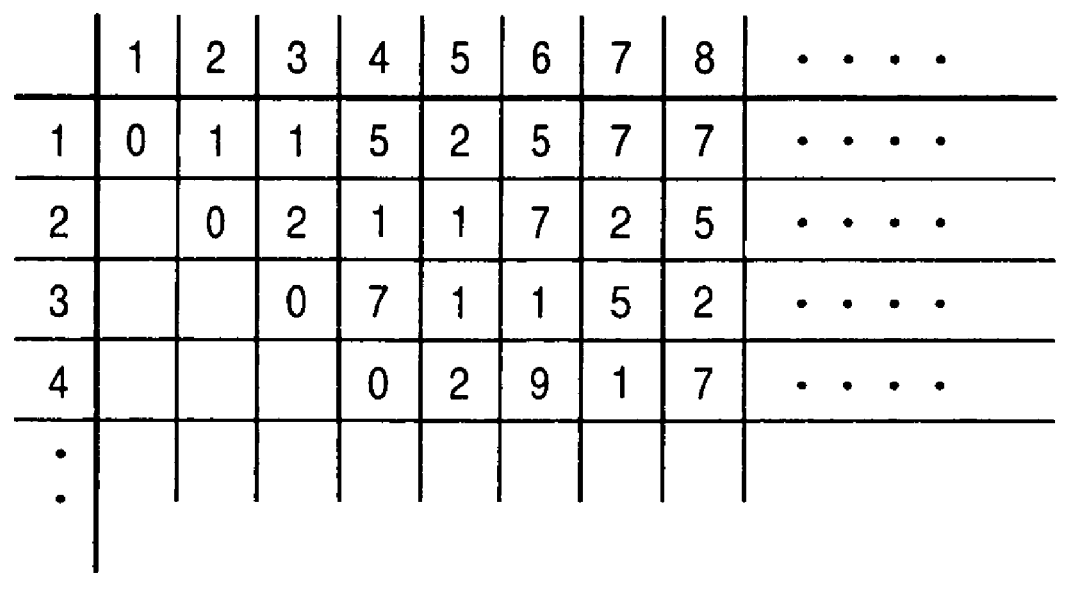

In order to give a small penalty (of distance) to neighboring cells and a large penalty to cells which are far from each other upon pattern matching between labels, a penalty matrix between labels shown in FIG. 10 is introduced. In step S20 or S22 in step S15, the label matrices are compared in consideration of this penalty matrix, and in this case, two-dimensional DP matching (to be referred to as 2D DP matching hereinafter) to be described below is used.

FIG. 11 is a view for explaining the similarity computation process according to this embodiment.

The query sequential label set acquired in step S14 can be arranged, as shown in a center of FIG. 11, in accordance with its scan method. Also, when one of label matrices of frame images for N previous frames, which are stored in the RAM is used as a test sequential label set of a test frame image, that sequential label set can be arranged, as shown in a left of FIG. 11.

The distances between a label sequence "abc" in the first line of the test sequential label set, and sequential label sets ("123", "456", "789") in the first to third lines of the query sequential label set are computed by DP matching, and the line number of the label sequence that minimizes distance in the query sequential label set is stored at the corresponding position in a similar line matrix (a right of FIG. 11). When the obtained minimum distance is larger than a predetermined threshold value, it is determined that the label sequence of interest of the test sequential label set is similar to none of the lines, and "!" is stored at the corresponding position in the similar line matrix. Even when an image angle has horizontally changed slightly, a similar line can be detected by the aforementioned process owing to the nature of DP matching. By repeating the aforementioned process for all the lines ("def", "ghi") in the similarity test image, the similar line matrix in the column direction shown in a right of FIG. 11 can be obtained.

In a right of FIG. 11, no line similar to "abc" is present in the query sequential label set, and a line similar to "def" is found in the first line of the query sequential label set, and a line similar to "ghi" is found in the second line of the query sequential label set. The similarity between the similar line matrix obtained in this manner, and a standard line matrix (the arrangement of lines in the query frame image, and "123" in this example) is further computed using DP matching, and is output as the similarity between the query and test frame images.

It is well known that DP matching selects a route in which similarity distance is minimized under a constraint condition of a matching window, as an optimum solution. The constraint condition may be given by a width of a matching window.

Figure 12:
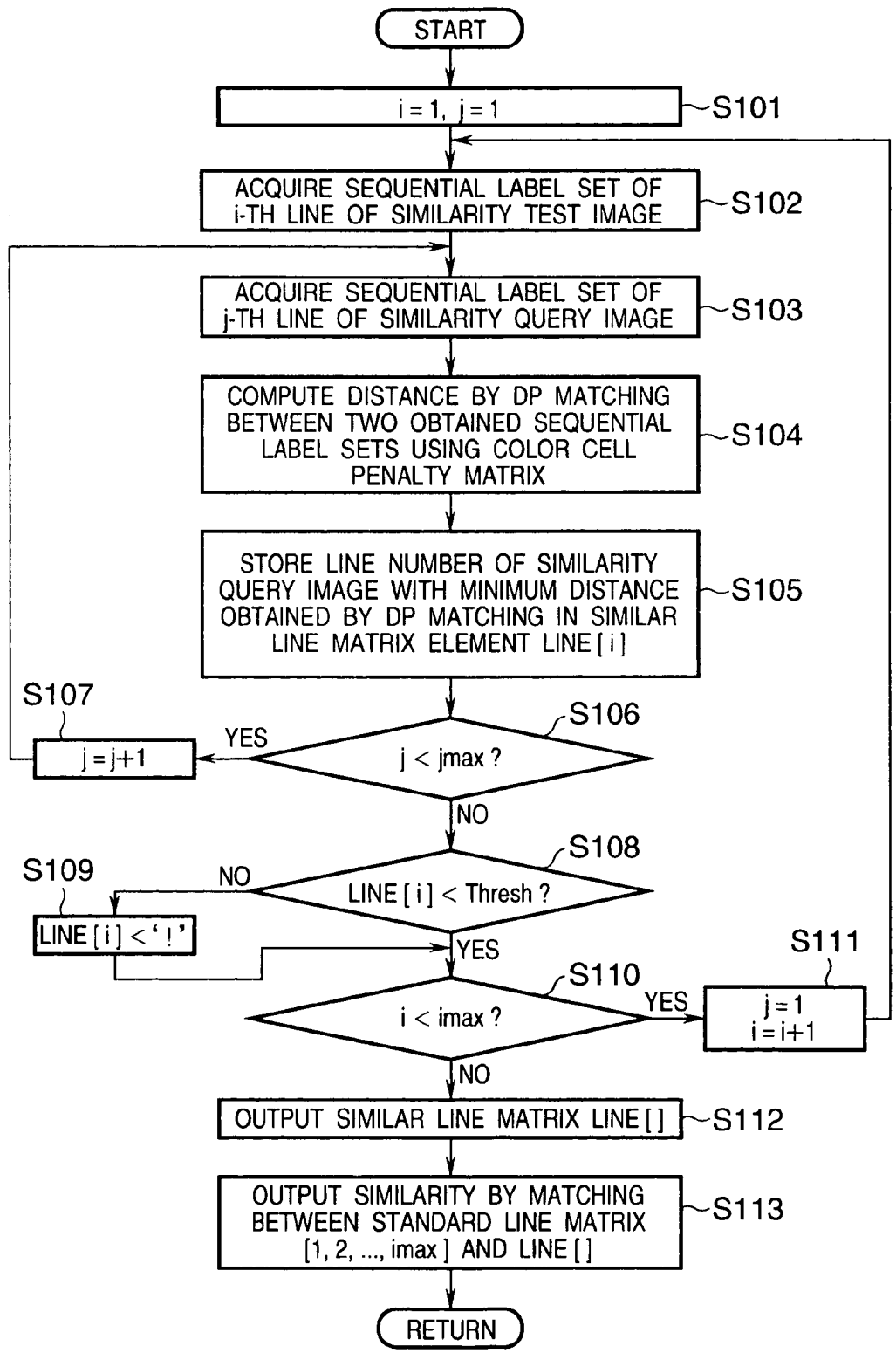
FIG. 12 is a flow chart for explaining the sequence of similarity computation using two-dimensional DP matching according to the embodiment of the present invention.

FIG. 12 is a flow chart for explaining the sequence of similarity computation using 2D DP matching according to this embodiment. The process that has been explained with reference to FIG. 11 will be explained in more detail below with reference to the flow chart in FIG. 12. Note that the process shown in this flow chart is executed for different similarity test images in steps S20 and S22.

In step S101, variable i indicating the line number of the test frame image and variable j indicating the line number of the query frame image are initialized to 1 to both indicate the first line. In step S102, a label sequence of the i-th line of the test frame image is acquired. For example, in case of FIG. 11, if i=1, "abc" is acquired. In step S103, a sequential label set of the j-th line of the query frame image is acquired. For example, in case of FIGS. 11A to 11C, if j=1, "123" is acquired.

In step S104, the distance between the two sequential label sets acquired in steps S102 and S103 is computed by DP matching using the penalty matrix of color cells described in FIG. 10. In step S105, if the distance obtained in step S104 is a minimum value of those obtained so far in association with the i-th line, the line number (j) of interest is stored in a line matrix element LINE[i].

The aforementioned processes in steps S103 to S105 are repeated for all lines of the similarity test image (steps S106 and S107). In this manner, the number of the line with a minimum distance of those included in the query frame image to the sequential label set of the i-th line of the test frame image is stored in LINE[i].

In step S108, LINE[i] obtained by the above process is compared with a predetermined threshold value (Thresh). If LINE[i] is equal to or larger than Thresh, the flow advances to step S109, and "!" indicating that the i-th line is similar to none of lines in the query image is stored in LINE[i].

The aforementioned processes from step S102 to step S108 are executed for all the lines in the test frame image (steps S110 and S111) to obtain LINE[imax] of LINE[1], which is output as a similar line matrix LINE[i].

In step S113, DP matching between a standard line matrix [1, 2, . . . , imax] and similar line matrix LINE[1, 2, . . . , imax] is done to compute the distance therebetween. Note that the standard line matrix starts from 1, and increases in unitary increments in the column direction.

A penalty used in DP matching between the standard line matrix and similar line matrix will be explained below. The present invention proposes a dynamic penalty as penalty setups of DP matching between the similar line matrix and standard line matrix in the column direction. The dynamic penalty dynamically sets a penalty between the line numbers, and the penalty between the line numbers changes depending on images. In this embodiment, sequential label set distances in the horizontal (line) direction of the similarity query image itself are computed, and penalties between lines are obtained based on these distances.

Figure 13:
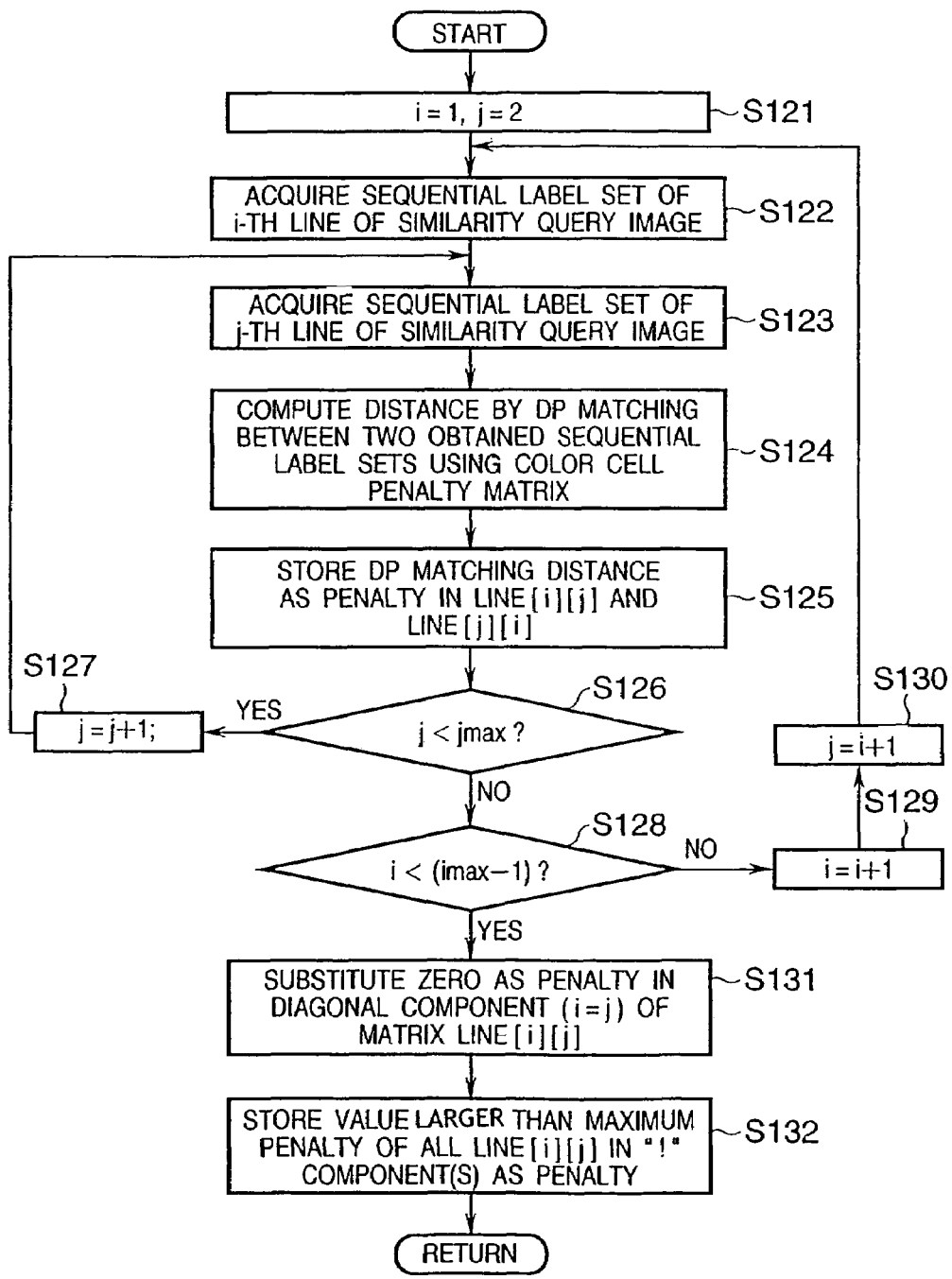
FIG. 13 is a flow chart showing the sequence for setting a dynamic penalty value according to the embodiment of the present invention.

FIG. 13 is a flow chart showing the setup sequence of a dynamic penalty value according to this embodiment.

In step S121, variables i and j are respectively set at 1 and 2. A sequential label set of the i-th line of the query frame image is acquired in step S122, and a sequential label set of the j-th line of the query frame image is acquired in step S123. In step S124, DP matching between the sequential label sets of the i- and j-th lines of the query frame image is done using the color penalty matrix to obtain distance. In step S125, the DP matching distance obtained in step S124 is stored in LINE[i][j] as a penalty between the sequential label sets of the i- and j-th lines of the query frame image, and is also stored in LINE[j][i] as a penalty between the sequential label sets of the j- and i-th lines of the query frame image.

The processes in steps S123 to S125 are repeated until the value of variable j reaches jmax in step S126. As a result, penalty values between the sequential label set of the i-th line, and sequential label sets of the (i+1)-th to (jmax)-th lines are determined. Then, the processes in steps S123 to S126 are repeated until the value of variable i reaches (imax−1) in steps S128, S129, and S130. As a result, penalty values determined by the above processes are stored in all LINE[i] [j] except for diagonal components of i=j.

In step S131, penalty values of the diagonal components of LINE[i] [j], which are not determined in the above processes, are determined. In this portion, since i=j, i.e., identical sequential label sets are compared, zero distance is obtained and, hence, zero penalty is stored. Also, a penalty for "!" is determined in step S132. That is, a penalty for "!" is set to have a value larger by the maximum one of all the penalty values of LINE[i][j] to some extent. If this penalty value is set to be extremely large, the feature of ambiguous search may suffer.

DP matching in step S113 is done using penalty among sequential label sets computed for the query frame images in this manner, thus obtaining the similarity between the query frame image and test frame image.

The aforementioned matching process also has the following feature. If the matrices shown in FIGS. 11A and 11B are very similar to each other, a similar line matrix "123" is obtained, and their distance is zero. On the other hand, if a similar line matrix is "!12" or "212", the test frame image is likely to have deviated downward from the query frame image; if a similar line matrix is "23!" or "233", the test frame image is likely to have deviated upward from the query frame image. On the other hand, if a similar line matrix is "13!" or "!13", the test frame image is likely to be reduced in scale with respect to the query frame image. Likewise, a test frame image obtained by enlarging the query frame image may be detected.

As described in step S113 above, by DP matching between the similar line matrix and standard line matrix, vertical deviation can be effectively absorbed. For this reason, the difference between the query frame image and test frame image resulting from the aforementioned upward or downward deviation, enlargement, reduction, or the like can be effectively absorbed, and the similarity between the frame images of a moving image can be satisfactorily determined.

More specifically, 2D DP matching of this embodiment allows ambiguity between the label sequences of the neighboring label matrices, and absorbs the influence of position deviations of an image. On the other hand, when the position of an object has changed due to, e.g., a difference in angle, and the position of the object extracted by blocks has changed, the tinctures of blocks may become slightly different, but such differences are absorbed by the aforementioned penalty matrix. In this manner, due to the synergism of 2D DP matching that allows ambiguity and allowance of ambiguity of feature amounts by means of the penalty matrix according to this embodiment, matching that is less influenced by upper, lower, right, and left deviations, and those caused by enlargement/reduction can be achieved.

Other merits of the dynamic penalty will be discussed below. For example, when there is a query frame image of stretched wheat fields, all lines may have similar sequential label sets. On the other hand, if there is also a test frame image of stretched wheat fields, a similar line matrix of this image may store the first line number "1" and may become "111". In such case, all lines of a similarity query image have similar images, and no hit occurs at shorter distances unless the penalty between line numbers is very small. However, when the dynamic penalty is used, the penalty between line numbers becomes small, and a result with high similarity can be obtained.

In the above embodiment, the similar line matrix is obtained using sequential label sets corresponding to the horizontal block arrangements. Alternatively, a similar line matrix can be obtained using label sequences corresponding to the vertical block arrangements by the same method as described above. Also, both the horizontal and vertical directions may be combined.

In the above embodiment, color information is selected as an image feature amount. However, the present invention is not limited to such specific image feature amount, and may be practiced by obtaining other image parameters in units of image segmented blocks.

The level of ambiguity upon comparing a query frame image and test frame image can be desirably set by changing the width of a so-called matching window in DP matching.

Figure 14:
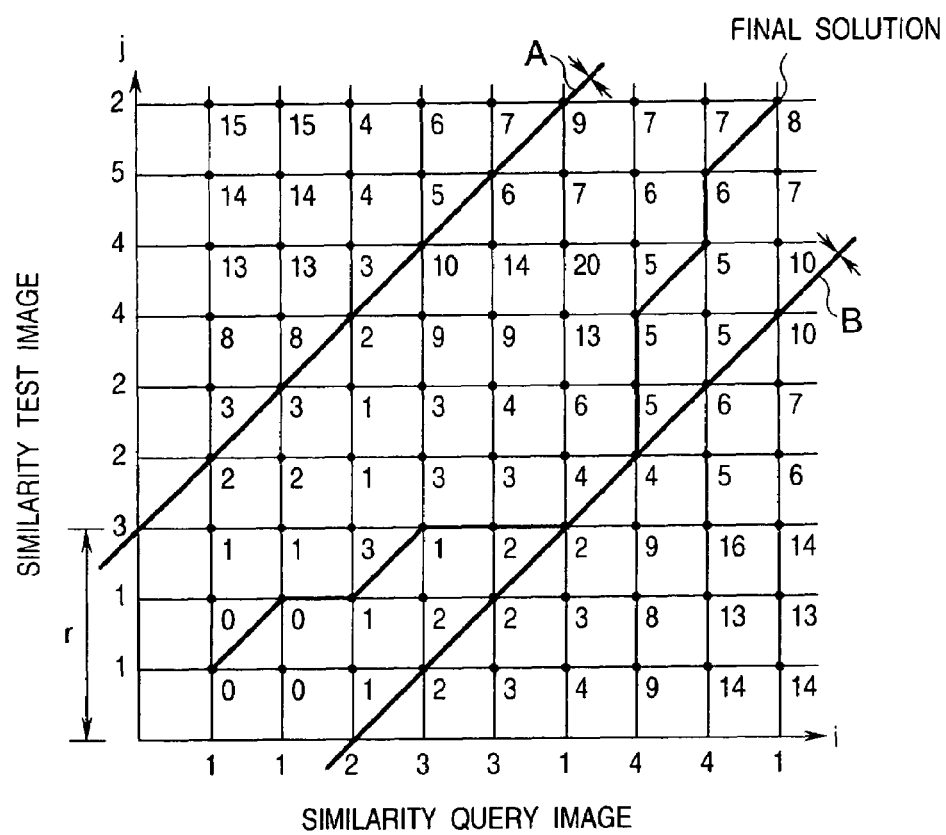
FIG. 14 is a view for explaining adjustment of a matching window in DP matching according to the embodiment of the present invention.

FIG. 14 is a view for explaining a matching window in DP matching. In FIG. 14, line A is given by J=I+r, and line B by J=I−r. The width of the matching window can be changed by changing the value r. Hence, when the value r is changed upon automatically or manually varying the ambiguity level, similarity computations can be made with a desired ambiguity level (width of the matching window), and such change is effective for scene change detection in a moving image including very quick motions, and that in a movie that considerably suffers camera shake. When the present apparatus is equipped in a movie, the value r is changed in accordance with a mount of shaking detected by a sensor. The user may change the sensitivity of scene change by manually change the value r at the keyboard 104, or the value r may be automatically increased when scene changes are detected too frequently or may be decreased when fewer scene changes are detected.

In 2D DP matching in the above embodiment, the width of a matching window in horizontal DP matching and that of a matching window in vertical DP matching may be independently set. Or the two matching windows may be changed at different rates. In this manner, ambiguity levels can be set very flexibly upon similarity computations. For example, when the block order shown in a left of FIG. 7 is used, and the horizontal movement of an object of interest in a query image is to be allowed, the width of the matching window in horizontal DP matching can be increased to increase the ambiguity level in the horizontal direction.

Referring back to the flow chart in FIG. 4, it is checked in step S16 if a scene change is detected in step S15. If YES in step S16, scene change information is additionally stored in the scene change information accumulation unit by the process in step S17. Finally, sequential label set of N previous frame image is discarded, and the sequential label set of the current frame image is stored in the RAM in step S18. The flow then returns to the process in step S10 to repeat the processes as long as frame images to be processed remain.

As described above, a feature amount group (a group of feature amounts obtained by segmenting a feature amount space) is expressed by a single symbol (i.e., labeled), and a distance based on the similarity between labels is given using the 2D DP matching and the penalty matrix described above. For this reason, since the computation volume of the distance between two image blocks can be greatly reduced, and similar feature amounts can be expressed by identical labels, the similarity between two images can be satisfactorily computed.

Since (1) the concept of defining distance between labels using the penalty matrix, and (2) 2D DP matching that can ambiguously move label positions to be compared, and can implement comparison between label matrices to minimize the total distance (maximize similarity) are used, an interframe pattern matcher which produces a clearly low interframe similarity output in response to appearance of a frame which has absolutely no continuity while absorbing some continuous changes in moving image (e.g., some color differences caused by a change in image angle, and a change in position or deformation of an object upon, e.g., panning of a camera, or a change in image sensing condition such as a light source or the like) in association with neighboring or adjacent image frames, can be implemented.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores a program including program codes corresponding to the aforementioned flow charts (shown in FIGS. 4, 9, 12, 13, and the like).

To recapitulate, according to the present invention, scene change detection can be implemented by an inter-frame pattern matcher which produces a clearly low inter-frame similarity output in response to appearance of a frame which has absolutely no continuity while absorbing some continuous changes in moving image (e.g., some color differences caused by a change in image angle, and a change in position or deformation of an object upon, e.g., panning of a camera, or a change in image sensing condition such as a light source or the like) in association with neighboring or adjacent image frames.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus comprising:
labeling means for extracting frame image data from moving image data, segmenting the frame image data into blocks, and respectively assigning, to the blocks, labels in accordance with feature amounts obtained in units of the blocks;
sequential label set generation means for generating a sequential label set by arranging the labels assigned by said labeling means in a predetermined block order;
sequential label set accumulation means for accumulating the sequential label set generated by said sequential label set generation means in connection with the frame image data
similarity computation means for computing similarities between the generated sequential label set and sequential label sets of a previous frame image data group;
scene change detection means for detecting a scene change frame in the moving image based on the similarities computed by said similarity computation means; and
scene change storage means for storing information of the detected scene change frame in connection with the frame image data,
wherein said scene change detection means detects a frame corresponding to the generated sequential label set as the scene change frame, when a plurality of similarities computed by said similarity computation means are less than a predetermined value
wherein said similarity computation means has a penalty table for holding penalty values in correspondence with pairs of label values, acquires penalty values by referring to the penalty table using pairs of label values obtained from a sequential label set of the frame image data of a scene change frame candidate and sequential label sets of the previous frame image data group, and computes the similarities based on the acquired penalty values.

2. An apparatus according to claim 1, wherein the information of the detected scene change frame includes the number of frames or an elapsed time from the beginning of the moving image to the detected scene change frame.

3. An apparatus according to claim 1, wherein the labels are unique labels which are given to individual cells obtained by segmenting a multi-dimensional feature amount space into a plurality of cells, and said labeling means computes a feature amount for each block, and assigns to that block a label given to the cell to which the computed feature amount belongs.

4. An apparatus according to claim 3, wherein the moving image is a color image, the feature amount corresponds to a position of a color element value in the multi-dimensional feature amount space, and the labels are unique labels given to individual cells obtained by segmenting the multi-dimensional feature amount space into a plurality of cells.

5. An apparatus according to claim 1, wherein the plurality of blocks are obtained by segmenting an image into a plurality of vertical and horizontal blocks, and the block order used by said sequential label set generation means is an order in which the plurality of blocks are scanned in a horizontal or vertical direction.

6. An apparatus according to claim 1, wherein said scene change detection means comprises determination means for determining a scene change when the similarity computed by said similarity computation means is not more than a predetermined value.

7. An apparatus according to claim 1, wherein the labels are unique labels which are given to individual cells obtained by segmenting a multi-dimensional feature amount space into a plurality of cells, and the penalty value is a value set based on a distance between cells expressed by two labels.

8. An apparatus according to claim 1, wherein said similarity computation means also gives penalty values representing degrees of similarity of the labels upon computing the similarity between the sequential label set of the frame image data of the scene change frame candidate and the sequential label sets of the previous frame image data group.

9. An apparatus according to claim 1, wherein said similarity computation means computes the similarities by DP matching, using the penalty values.

10. An apparatus according to claim 9, wherein said similarity computation means further comprises setting means for setting a width of a matching window of DP matching to be used.

11. An apparatus according to claim 10, wherein when said apparatus is equipped in a movie, the width of a matching window is changed in accordance with a mount of shaking detected by a sensor.

12. An image processing apparatus comprising:
  labeling means for extracting frame image data from moving image data, segmenting the frame image data into blocks, and respectively assigning, to the blocks, labels in accordance with feature amounts obtained in units of the blocks;
  sequential label set generation means for generating a sequential label set by arranging the labels assigned by said labeling means in a predetermined block order, wherein the sequential label set represents a two-dimensional matrix set;
  sequential label set accumulation means for accumulating the sequential label set generated by said sequential label set generation means in connection with the frame image data
  similarity computation means for computing similarities between the generated sequential label set and sequential label sets of a previous frame image data group, wherein said similarity computation means comprises:
    first matching means for corresponding sequential label sets in units of lines extracted from a label matrix of frame image data of a scene change frame candidate, and sequential label sets in units of lines extracted from a label matrix of previous frame image data by DP matching to obtain a line arrangement of the extracted image data; and
    second matching means for obtaining a similarity between a line arrangement of the label matrix of the frame image data of the scene change frame candidate and the line arrangement obtained by said first matching means by DP matching;
  scene change detection means for detecting a scene change frame in the moving image based on the similarity obtained by said second matching means; and
  scene change storage means for storing information of the detected scene change frame in connection with the frame image data
  wherein said scene change detection means detects a frame corresponding to the generated sequential label set as the scene change frame, when a plurality of similarities computed by said similarity computation means are less than a predetermined value.

13. An apparatus according to claim 12, wherein the sequential label sets in units of lines are each an arrangement corresponding to a horizontal direction of an image.

14. An apparatus according to claim 12, wherein the sequential label sets in units of lines is an arrangement corresponding to a vertical direction of an image.

15. An apparatus according to claim 14, wherein said first matching means gives a penalty and constraint upon scaling a sequential label set to be compared when similarity between a label sequence of source image data and a sequential label set stored in said storage means is computed.

16. An apparatus according to claim 15, wherein the penalty and constraint upon scaling the sequential label set to be compared are acquired on the basis of a theory of DP matching.

17. An apparatus according to claim 12, further comprising frame determination means for determining the frame image data of the scene change frame candidate to be scene change frame image data, when the similarity obtained by said second matching means is not more than a predetermined value, and similarities obtained by said second matching means as a result of the same processes for previous frame images are not more than the predetermined value.

18. An apparatus according to claim 12, wherein said first matching means has a penalty table for holding penalty values in correspondence with pairs of labels, and refers to the penalty table upon computing a distance between a sequential label set of the frame image data of the scene change frame candidate and the sequential label set of the previous frame image data using DP matching.

19. An apparatus according to claim 12, wherein said second matching means has an inter-line penalty table for holding penalty values in correspondence with pairs of line numbers in the line arrangement, and refers to the inter-line penalty table upon computing similarity between the line arrangement of the frame image data of the scene change frame candidate and the line arrangement of the previous frame image using DP matching.

20. An apparatus according to claim 19, further comprising penalty holding means for determining penalty values corresponding to pairs of lines on the basis of similarities of sequential label sets of the frame image data of the scene change frame candidate in the line direction, and holding the determined penalty values as the inter-line penalty table.

21. An apparatus according to claim 12, further comprising first matching window setting means for setting a width of a matching window of DP matching used by said first matching means.

22. An apparatus according to claim 12, further comprising second matching window setting means for setting a width of a matching window of DP matching used by said second matching means.

23. A scene change detection method comprising the steps of:
  extracting frame image data from moving image data, segmenting the frame image data into blocks, and respectively assigning, to the blocks, labels in accordance with feature amounts obtained in units of blocks;

generating a sequential label set by arranging the assigned labels in a predetermined block order;

computing similarities between the generated sequential label set and sequential label sets of a previous frame image data group; and detecting a scene change frame in the moving image based on the computed similarities, wherein said similarity computation step uses a penalty table for holding penalty values in correspondence with pairs of label values, and includes the steps of acquiring penalty values by referring to the penalty table using pairs of label values obtained from a sequential label set of the frame image data of a scene change frame candidate and sequential label sets of the previous frame image data group, and computing the similarities based on the acquired penalty values.

24. A method according to claim 23, wherein information of the detected scene change frame includes the number of frames or an elapsed time from the beginning of the moving image to the detected scene change frame.

25. A method according to claim 23, wherein the labels are unique labels which are given to individual cells obtained by segmenting a multi-dimensional feature amount space into a plurality of cells, and said extracting and assigning step includes the step of computing a feature amount for each block, and assigning to that block a label given to the cell to which the computed feature amount belongs.

26. A method according to claim 25, wherein the moving image is a color image, the feature amount corresponds to a position of a color element value in the multi-dimensional feature amount space, and the labels are unique labels given to cells obtained by segmenting the multi-dimensional feature amount space into a plurality of cells.

27. A method according to claim 23, wherein the plurality of blocks are obtained by segmenting an image into a plurality of vertical and horizontal blocks, and the block order used in said sequential label set generating step is an order in which the plurality of blocks are scanned in a horizontal or vertical direction.

28. A method according to claim 23, wherein said scene change detecting step includes the step of determining a scene change when the similarity computed in said similarity computing step is not more than a predetermined value.

29. A method according to claim 23, wherein the labels are unique labels which are given to individual cells obtained by segmenting a multi-dimensional feature amount space into a plurality of cells, and the penalty value is a value set based on a distance between cells expressed by two labels.

30. A method according to claim 23, wherein said similarity computation step includes the step of also giving penalty values representing degrees of similarity of the labels upon computing the similarity between the sequential label set of the frame image data of the scene change frame candidate and the sequential label sets of the previous frame image data group.

31. A method according to claim 23, wherein said similarity computation step includes the step of computing the similarities by DP matching, using the penalty values.

32. A method according to claim 31, wherein said similarity computing step includes the step of setting a width of a matching window of DP matching to be used.

33. A method according to claim 32, wherein in a movie, the width of a matching window is changed in accordance with a mount of shaking detected by a sensor.

34. A scene change detection method comprising the steps of:

extracting frame image data from moving image data, segmenting the frame image data into blocks, and respectively assigning, to the blocks, labels in accordance with feature amounts obtained in units of the blocks;

generating a sequential label set by arranging the assigned labels in a predetermined block order;

computing similarities between the generated sequential label set and sequential label sets of a previous frame image data group; and detecting a scene change frame in the moving image based on the computed similarities, wherein the sequential label set represents a two-dimensional matrix set, and said similarity computation step includes:

a first matching step, of corresponding sequential label sets in units of lines extracted from a label matrix of frame image data of a scene change frame candidate, and sequential label sets in units of lines extracted from a label matrix of previous frame image data by DP matching to obtain a line arrangement of the extracted image data; and a second matching step, of obtaining a similarity between a line arrangement of the label matrix of the frame image data of the scene change frame candidate, and the line arrangement obtained by said first matching means by DP matching.

35. A method according to claim 34, wherein the sequential label sets in units of lines are each an arrangement corresponding to a horizontal direction of an image.

36. A method according to claim 34, wherein the sequential label sets in units of lines are each an arrangement corresponding to a vertical direction of an image.

37. A method according to claim 36, wherein said first matching step includes the step of giving a penalty and constraint upon scaling a sequential label set to be compared when similarity between a sequential label set of source image data and a sequential label set stored in storage means is computed.

38. A method according to claim 37, wherein the penalty and constraint upon scaling the sequential label set to be compared are acquired on the basis of a theory of DP matching.

39. A method according to claim 34, wherein the frame image data of the scene change frame candidate is determined to be scene change frame image data, when the similarity obtained in said second matching step is not more than a predetermined value, and similarities obtained in said second matching step as a result of the same processes for previous frame images are not more than the predetermined value.

40. A method according to claim 34, wherein said first matching step uses a penalty table for holding penalty values in correspondence with pairs of labels, and includes the step of referring to the penalty table upon computing a distance between a sequential label set of the frame image data of the scene change frame candidate and the sequential label set of the previous frame image data using DP matching.

41. A method according to claim 34, wherein said second matching step uses an inter-line penalty table for holding penalty values in correspondence with pairs of line numbers in the line arrangement, and includes the step of referring to the inter-line penalty table upon computing similarity between the line arrangement of the frame image data of the scene change frame candidate and the line arrangement of the previous frame image using DP matching.

42. A method according to claim 41, wherein penalty values corresponding to pairs of lines are determined on the basis of similarities of sequential label sets of the frame image data of the scene change frame candidate in the line direction, and the determined penalty values are held as the inter-line penalty table.

43. A method according to claim 34, wherein a width of a matching window of DP matching used in said first matching step is set.

44. A method according to claim 34, wherein a width of a matching window of DP matching used in said second matching step is set.

45. A storage medium for storing a control program for making a computer execute a scene change detection method, said method comprising the steps of:

extracting frame image data from moving image data, segmenting the frame image data into blocks, and respectively assigning, to the blocks, labels in accordance with feature amounts obtained in units of blocks;

generating a sequential label set by arranging the assigned labels in a predetermined block order;

computing similarities between the generated sequential label set and sequential label sets of a previous frame image data group; and detecting a scene change frame in the moving image based on the computed similarities, wherein said similarity computation step uses a penalty table for holding penalty values in correspondence with pairs of label values, and includes the steps of acquiring penalty values by referring to the penalty table using pairs of label values obtained from a sequential label set of the frame image data of a scene change frame candidate and sequential label sets of the previous frame image data group, and computing the similarities base on the acquired penalty values.

46. A medium according to claim 45, wherein the labels are unique labels which are given to individual cells obtained by segmenting a multi-dimensional feature amount space into a plurality of cells, and said extracting and assigning step includes the step of computing a feature amount for each block, and assigning to that block a label given to the cell to which the computed feature amount belongs.

47. A medium according to claim 45, wherein said similarity computing step includes the step of computing the similarities by DP matching using penalty values.

48. A medium according to claim 45, wherein said control program further includes the step of determining penalty values corresponding to pairs of lines on the basis of similarities of sequential label sets of the frame image data of the scene change frame candidate in the line direction, and holding the determined penalty values as the inter-line penalty table.

49. A medium according to claim 45, wherein, in a movie, the width of a matching window is changed in accordance with a mount of shaking detected by a sensor.

50. A storage medium storing a control program for making a computer execute a scene change detection method, wherein the method comprises the steps of:

extracting frame image data from moving image data, segmenting the frame image data into blocks, and respectively assigning, to the blocks, labels in accordance with feature amounts obtained in units of blocks;

generating a sequential label set by arranging the assigned labels in a predetermined block order;

computing similarities between the generated sequential label set and sequential label sets of a previous frame image data group; and detecting a scene change frame in the moving image based on the computed similarities, wherein the sequential label set represents a two-dimensional matrix set, and said similarity computing step includes:

a first matching step, of corresponding sequential label sets in units of lines extracted from a label matrix of frame image data of a scene change frame candidate, and sequential label sets in units of lines extracted from a label matrix of previous frame image data by DP matching to obtain a line arrangement of the extracted image data; and a second matching step, of obtaining a similarity between a line arrangement of the label matrix of the frame image data of the scene change frame candidate, and the line arrangement obtained by said first matching means by DP matching.

51. A medium according to claim 50, wherein the frame image data of the scene change frame candidate is determined to be scene change frame image data, when the similarity obtained in said second matching step becomes not more than a predetermined value, and similarities obtained in said second matching step as a result of the same processes for previous frame images become not more than the predetermined value.

52. A medium according to claim 50, wherein said first matching step uses a penalty table for holding penalty values in correspondence with pairs of labels, and includes the step of referring to the penalty table upon computing a distance between a sequential label set of the frame image data of the scene change frame candidate and the sequential label set of the previous frame image data using DP matching.

53. A medium according to claim 50, wherein said second matching step uses an inter-line penalty table for holding penalty values in correspondence with pairs of line numbers in the line arrangement, and includes the step of referring to the inter-line penalty table upon computing similarity between the line arrangement of the frame image data of the scene change frame candidate and the line arrangement of the previous frame image using DP matching.

54. A medium according to claim 50, wherein a first matching step includes the step of giving a penalty and constraint upon scaling a sequential label set to be compared when similarity between a label sequence of source image data and a sequential label set stored in storage means is computed.

55. A medium according to claim 50, wherein said first matching step and/or said second matching step include/includes the step of setting a width of a matching window of DP matching used.

* * * * *

UNITED STATES PATENT AND TRADEMARK OFFICE
CERTIFICATE OF CORRECTION

PATENT NO. : 6,977,963 B1 Page 1 of 1
APPLICATION NO. : 09/503477
DATED : December 20, 2005
INVENTOR(S) : Hirotaka Shiiyama It is certified that error appears in the above-identified patent and that said Letters Patent is hereby corrected as shown below:

Column 5,
Line 22, "step S1," should read -- step S11, --.

Column 10,
Line 39, "a mount" should read -- an amount --.
Line 41, "change" should read -- changing --.

Column 12,
Line 22, "data" should read -- data; --.
Line 37, "value" should read -- value, --.

Column 13,
Line 29, "equipped in a movie," should read -- used for a movie, --.
Line 31, "a mount" should read -- an amount --.
Line 47, "data" should read -- data; --.

Column 14,
Line 3, "data" should read -- data, --.

Column 16,
Line 3, "a mount" should read -- an amount --.

Column 17,
Line 39, "base" should read -- based --.
Line 60, "a mount" should read -- an amount --.

Signed and Sealed this

Eleventh Day of July, 2006

JON W. DUDAS
*Director of the United States Patent and Trademark Office*